(12) United States Patent
Kamerbeek et al.

(10) Patent No.: US 11,198,557 B2
(45) Date of Patent: *Dec. 14, 2021

(54) CAPSULE, A SYSTEM FOR PREPARING A POTABLE BEVERAGE

(71) Applicant: KONINKLIJKE DOUWE EGBERTS B.V., Utrecht (NL)

(72) Inventors: Ralf Kamerbeek, De Meern (NL); Arend Hendrik Groothornte, Borculo (NL); Hielke Dijkstra, Neede (NL); Erik Pieter Van Gaasbeek, Borculo (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 116 days.

This patent is subject to a terminal disclaimer.

(21) Appl. No.: 16/340,091

(22) PCT Filed: Oct. 9, 2017

(86) PCT No.: PCT/NL2017/050663
§ 371 (c)(1),
(2) Date: Apr. 5, 2019

(87) PCT Pub. No.: WO2018/067013
PCT Pub. Date: Apr. 12, 2018

(65) Prior Publication Data
US 2020/0047986 A1  Feb. 13, 2020

(30) Foreign Application Priority Data
Oct. 7, 2016  (NL) ...................................... 2017592

(51) Int. Cl.
*B65D 85/804* (2006.01)
*A23F 5/26* (2006.01)
(Continued)

(52) U.S. Cl.
CPC .......... *B65D 85/8043* (2013.01); *A23F 5/262* (2013.01); *A47J 31/3628* (2013.01); *A47J 31/407* (2013.01)

(58) Field of Classification Search
CPC .... A47J 31/3628; A47J 31/407; A47J 31/369; A47J 31/36; A47J 31/3623; A47J 31/3695
(Continued)

(56) References Cited

U.S. PATENT DOCUMENTS 4,651,538 A  3/1987 Bull
5,798,599 A  8/1998 Harwood
(Continued)

FOREIGN PATENT DOCUMENTS

AU  2015255218 A1  11/2015
AU  2015255218 A1  11/2015
(Continued)

OTHER PUBLICATIONS

"Nespresso", Wikipedia Archive, published Nov. 29, 2012, 8 pages.
(Continued)

*Primary Examiner* — Phuong T Nguyen
(74) *Attorney, Agent, or Firm* — Fitch, Even, Tabin & Flannery LLP

(57) ABSTRACT

Capsule containing a substance for the preparation of a potable beverage, the capsule having an aluminum capsule body having a side wall and an outwardly extending flange and a sealing member at the outwardly extending flange for providing a fluid sealing contact with an enclosing member of a beverage preparation device. The beverage preparation device comprises an annular element having a free contact end which may be provided with a plurality of radially extending open grooves. The sealing member is integral with the outwardly extending flange and comprises a projection. An annular trough between the inner projection foot
(Continued)

and the side wall has a bottom axially spaced from the outer projection foot towards the bottom of the capsule body.

53 Claims, 7 Drawing Sheets

(51) Int. Cl.
    *A47J 31/36*     (2006.01)
    *A47J 31/40*     (2006.01)

(58) Field of Classification Search
    USPC ......... 99/279, 283, 284, 285, 295, 300, 307, 99/323
    See application file for complete search history.

(56) References Cited

U.S. PATENT DOCUMENTS

| | | | |
|---|---|---|---|
| 5,897,899 A | 4/1999 | Fond | |
| 6,550,157 B1 | 4/2003 | Harding | |
| 8,176,714 B2 | 5/2012 | Abegglen | |
| 2001/0048178 A1 | 12/2001 | Jud | |
| 2005/0061705 A1 | 3/2005 | Spallek | |
| 2005/0084695 A1 | 4/2005 | Shirane | |
| 2005/0155991 A1 | 7/2005 | Jackman | |
| 2006/0110507 A1 | 5/2006 | Yoakim | |
| 2007/0202237 A1 | 8/2007 | Yoakim | |
| 2008/0044603 A1 | 2/2008 | Hutchinson | |
| 2009/0017177 A1 | 1/2009 | Yoakim et al. | |
| 2009/0223373 A1 | 9/2009 | Kollep | |
| 2009/0280219 A1 | 11/2009 | Yoakim | |
| 2009/0320692 A1 | 12/2009 | Simanski | |
| 2010/0015307 A1 | 1/2010 | Abegglen et al. | |
| 2010/0178404 A1 | 7/2010 | Yoakim | |
| 2010/0183777 A1 | 7/2010 | Sagy | |
| 2011/0000917 A1 | 1/2011 | Wolters | |
| 2011/0020500 A1 | 1/2011 | Eichler | |
| 2011/0027547 A1 | 2/2011 | Xun | |
| 2011/0041702 A1 | 2/2011 | Yoakim | |
| 2011/0185910 A1 | 8/2011 | Ryser | |
| 2011/0185911 A1 | 8/2011 | Rapparini | |
| 2011/0200725 A1 | 8/2011 | Kollep | |
| 2011/0259204 A1 | 10/2011 | Kaeser | |
| 2011/0315021 A1 | 12/2011 | Eichler | |
| 2012/0031794 A1 | 2/2012 | Ozanne | |
| 2012/0225168 A1 | 9/2012 | Kamerbeek | |
| 2012/0231123 A1 | 9/2012 | Kamerbeek | |
| 2012/0244384 A1 | 9/2012 | Burt | |
| 2012/0251694 A1 | 10/2012 | Kamerbeek | |
| 2013/0099597 A1 | 4/2013 | Perentes et al. | |
| 2013/0180408 A1 | 7/2013 | Eichler et al. | |
| 2013/0224341 A1 | 8/2013 | Bendavid | |
| 2013/0259982 A1 | 10/2013 | Abegglen | |
| 2013/0340478 A1 | 12/2013 | Miyoshi | |
| 2014/0170271 A1 | 6/2014 | Zweed et al. | |
| 2014/0178537 A1 | 6/2014 | Zweed et al. | |
| 2014/0328983 A1 | 11/2014 | Jarisch | |
| 2015/0033947 A1 | 2/2015 | Van Der Kamp | |
| 2015/0151903 A1 | 6/2015 | Bartoli | |
| 2015/0223632 A1 | 8/2015 | Hall | |
| 2016/0037961 A1 | 2/2016 | Digiuni | |
| 2016/0075506 A1 | 3/2016 | Chapman | |
| 2016/0159563 A1 | 6/2016 | Bartoli | |
| 2016/0353918 A1 | 12/2016 | Talon | |
| 2016/0362246 A1 | 12/2016 | Garcin | |
| 2016/0362247 A1 | 12/2016 | Bartoli | |
| 2017/0158422 A1 | 6/2017 | Andreae | |
| 2017/0325619 A1 | 11/2017 | Holten | |
| 2018/0105355 A1 | 4/2018 | Harif | |
| 2018/0257856 A1 | 9/2018 | Oliver | |
| 2018/0273286 A1 | 9/2018 | Dijkstra | |
| 2018/0289201 A1 | 10/2018 | Dijkstra | |
| 2018/0290824 A1 | 10/2018 | Dijkstra | |
| 2018/0290825 A1 | 10/2018 | Dijkstra | |
| 2018/0297775 A1 | 10/2018 | Dijkstra | |
| 2018/0297776 A1 | 10/2018 | Dijkstra | |
| 2019/0077588 A1 | 3/2019 | Bartel | |
| 2019/0177078 A1 | 6/2019 | Dijkstra | |
| 2020/0047986 A1 | 2/2020 | Kamerbeek | |
| 2020/0047987 A1 | 2/2020 | Kamerbeek | |

FOREIGN PATENT DOCUMENTS

| | | |
|---|---|---|
| AU | 2016253679 A1 | 11/2016 |
| AU | 2016253679 A1 | 11/2016 |
| AU | 2017219060 A1 | 9/2017 |
| AU | 2017219060 A1 | 9/2017 |
| CA | 2901582 A1 | 11/2014 |
| CA | 2901582 A1 | 11/2014 |
| CN | 105188488 | 12/2015 |
| DE | 10 2008 014 758 A1 | 10/2009 |
| DE | 20 2009 009 125 U1 | 9/2010 |
| DE | 10 2010 027 484 A1 | 1/2012 |
| DE | 10 2010 034 260 A1 | 2/2012 |
| DE | 10 2010 047 890 A1 | 2/2012 |
| DE | 20 2013 005 950 U1 | 11/2013 |
| DE | 20 2015 004 716 U1 | 10/2015 |
| DE | 202016106171 U1 | 11/2016 |
| EP | 0468079 | 1/1992 |
| EP | 0 844 195 B1 | 5/1998 |
| EP | 1 165 398 B1 | 1/2002 |
| EP | 1 190 959 B1 | 3/2002 |
| EP | 1 299 022 B1 | 4/2003 |
| EP | 1 339 305 B1 | 9/2003 |
| EP | 1 646 305 B1 | 4/2006 |
| EP | 1 654 966 B1 | 5/2006 |
| EP | 1 700 548 B1 | 9/2006 |
| EP | 1 700 584 A1 | 9/2006 |
| EP | 1 816 934 B1 | 8/2007 |
| EP | 1 839 543 B1 | 10/2007 |
| EP | 1 849 715 B1 | 10/2007 |
| EP | 1 859 712 B1 | 11/2007 |
| EP | 1 859 714 B1 | 11/2007 |
| EP | 1 882 431 B1 | 1/2008 |
| EP | 1 882 432 B1 | 1/2008 |
| EP | 1 892 199 A1 | 2/2008 |
| EP | 1 900 653 B1 | 3/2008 |
| EP | 1 967 099 B1 | 9/2008 |
| EP | 2 012 994 B1 | 1/2009 |
| EP | 2 029 457 B1 | 3/2009 |
| EP | 2 068 684 B1 | 6/2009 |
| EP | 2 070 828 B1 | 6/2009 |
| EP | 2 142 054 B1 | 1/2010 |
| EP | 2 151 313 B1 | 2/2010 |
| EP | 2 205 133 B1 | 7/2010 |
| EP | 2 229 082 B1 | 9/2010 |
| EP | 2 230 195 A1 | 9/2010 |
| EP | 2 284 100 B1 | 2/2011 |
| EP | 2 284 101 B1 | 2/2011 |
| EP | 2284101 B1 | 2/2011 |
| EP | 2289820 A1 | 3/2011 |
| EP | 2308776 A1 | 4/2011 |
| EP | 2 334 564 B1 | 6/2011 |
| EP | 2 364 930 A2 | 9/2011 |
| EP | 2 374 383 B1 | 10/2011 |
| EP | 2 385 922 B1 | 11/2011 |
| EP | 2 489 609 A1 | 8/2012 |
| EP | 2489609 A1 | 8/2012 |
| EP | 2 512 302 B1 | 10/2012 |
| EP | 2516296 | 10/2012 |
| EP | 2516296 A1 | 10/2012 |
| EP | 2 573 008 A1 | 3/2013 |
| EP | 2 631 198 A1 | 8/2013 |
| EP | 2 631 199 A1 | 8/2013 |
| EP | 2 682 028 A1 | 1/2014 |
| EP | 2 690 035 A1 | 1/2014 |
| EP | 2 712 824 A1 | 4/2014 |
| EP | 2712824 | 4/2014 |
| EP | 2712824 A1 | 4/2014 |
| EP | 2 757 056 A1 | 7/2014 |
| EP | 2 801 538 A1 | 11/2014 |
| EP | 2 868 598 A1 | 5/2015 |
| EP | 3 023 360 B1 | 5/2016 |
| ES | 1137034 U | 3/2015 |

(56) References Cited

FOREIGN PATENT DOCUMENTS

| | | |
|---|---|---|
| ES | 1137034 U | 3/2015 |
| ES | 1142506 U | 8/2015 |
| ES | 1142506 U | 8/2015 |
| FR | 2973209 A1 | 10/2012 |
| GB | 2 503 697 B | 12/2014 |
| GB | 2 519 319 A | 4/2015 |
| GB | 2519319 A | 4/2015 |
| GB | 2 503 774 B | 6/2015 |
| GB | 2 523 775 A | 9/2015 |
| GB | 2523775 A | 9/2015 |
| WO | 2006045515 | 5/2006 |
| WO | 2006045536 A1 | 5/2006 |
| WO | WO-2006/045536 A1 | 5/2006 |
| WO | 2007122206 A1 | 11/2007 |
| WO | WO-2007/122206 A1 | 11/2007 |
| WO | 2008037642 A1 | 4/2008 |
| WO | WO-2008/037642 A1 | 4/2008 |
| WO | 2009115474 A1 | 9/2009 |
| WO | 2009128016 A1 | 10/2009 |
| WO | WO-2009/128016 A1 | 10/2009 |
| WO | 2010055465 A1 | 5/2010 |
| WO | WO-2010/055465 A1 | 5/2010 |
| WO | 2010084475 A2 | 7/2010 |
| WO | WO-2010/084475 A2 | 7/2010 |
| WO | 2010115970 A1 | 10/2010 |
| WO | 2010116284 A2 | 10/2010 |
| WO | WO-2010/115970 A1 | 10/2010 |
| WO | WO-2010/116284 A2 | 10/2010 |
| WO | 2010128844 A1 | 11/2010 |
| WO | WO-2010/128844 A1 | 11/2010 |
| WO | 2010137946 | 12/2010 |
| WO | 2010137952 A1 | 12/2010 |
| WO | WO-2010/137952 A1 | 12/2010 |
| WO | 2011000005 A1 | 1/2011 |
| WO | 2011010263 A1 | 1/2011 |
| WO | WO-2011/000005 A1 | 1/2011 |
| WO | WO-2011/010263 A1 | 1/2011 |
| WO | 2011092301 | 8/2011 |
| WO | 2011113854 A2 | 9/2011 |
| WO | WO-2011/113854 A2 | 9/2011 |
| WO | 2012011053 A1 | 1/2012 |
| WO | WO-2012/011053 A1 | 1/2012 |
| WO | 2012013556 A1 | 2/2012 |
| WO | WO-2012/013556 A1 | 2/2012 |
| WO | 2012038063 A1 | 3/2012 |
| WO | WO-2012/038063 A1 | 3/2012 |
| WO | 2012045184 A1 | 4/2012 |
| WO | WO-2012/045184 A1 | 4/2012 |
| WO | 2012100836 | 8/2012 |
| WO | 2012110323 A1 | 8/2012 |
| WO | WO-2012/110323 A1 | 8/2012 |
| WO | 2012118367 A1 | 9/2012 |
| WO | 2012120459 A1 | 9/2012 |
| WO | 2012122329 A1 | 9/2012 |
| WO | 2012123857 A1 | 9/2012 |
| WO | WO-2012/118367 A1 | 9/2012 |
| WO | WO-2012/120459 A1 | 9/2012 |
| WO | WO-2012/122329 A1 | 9/2012 |
| WO | WO-2012/123857 A1 | 9/2012 |
| WO | 2012144885 A1 | 10/2012 |
| WO | WO-2012/144885 A1 | 10/2012 |
| WO | 2013043048 A1 | 3/2013 |
| WO | WO-2013/043048 A1 | 3/2013 |
| WO | 2013046014 A1 | 4/2013 |
| WO | 2013053655 A1 | 4/2013 |
| WO | WO-2013/046014 A1 | 4/2013 |
| WO | 2013060654 A1 | 5/2013 |
| WO | 2013060918 A1 | 5/2013 |
| WO | 2013068242 A1 | 5/2013 |
| WO | WO-2013/060654 A1 | 5/2013 |
| WO | WO-2013/060918 A1 | 5/2013 |
| WO | WO-2013/068242 A1 | 5/2013 |
| WO | 2013079811 A1 | 6/2013 |
| WO | WO-2013/079811 A1 | 6/2013 |
| WO | 2013132435 A1 | 9/2013 |
| WO | 2013135937 A2 | 9/2013 |
| WO | 2013136209 A1 | 9/2013 |
| WO | 2013136240 A1 | 9/2013 |
| WO | WO-2013/132435 A1 | 9/2013 |
| WO | WO-2013/135937 A2 | 9/2013 |
| WO | WO-2013/136209 A1 | 9/2013 |
| WO | WO-2013/136240 A1 | 9/2013 |
| WO | 2013144838 A1 | 10/2013 |
| WO | 2013153169 A2 | 10/2013 |
| WO | 2013157924 | 10/2013 |
| WO | 2013157924 A1 | 10/2013 |
| WO | 2013157927 A | 10/2013 |
| WO | WO-2013/144838 A1 | 10/2013 |
| WO | WO-2013/153169 A2 | 10/2013 |
| WO | WO-2013/157927 A1 | 10/2013 |
| WO | 2013164669 A1 | 11/2013 |
| WO | WO-2013/164669 A1 | 11/2013 |
| WO | 2013189923 A1 | 12/2013 |
| WO | 2013190426 A1 | 12/2013 |
| WO | WO-2013/189923 A1 | 12/2013 |
| WO | WO-2013/190426 A1 | 12/2013 |
| WO | 2014001584 A1 | 1/2014 |
| WO | 2014012779 A2 | 1/2014 |
| WO | 2014012783 A2 | 1/2014 |
| WO | WO-2014/001584 A1 | 1/2014 |
| WO | WO-2014/012779 A2 | 1/2014 |
| WO | WO-2014/012783 A2 | 1/2014 |
| WO | 2014033344 A1 | 3/2014 |
| WO | WO-2014/033344 A1 | 3/2014 |
| WO | 2014053638 A1 | 4/2014 |
| WO | WO-2014/053638 A1 | 4/2014 |
| WO | 2014067507 A2 | 5/2014 |
| WO | 2014072942 A2 | 5/2014 |
| WO | 2014076041 A1 | 5/2014 |
| WO | WO-2014/067507 A2 | 5/2014 |
| WO | WO-2014/072942 A2 | 5/2014 |
| WO | WO-2014/076041 A1 | 5/2014 |
| WO | 2014118812 A1 | 8/2014 |
| WO | 2014125390 A1 | 8/2014 |
| WO | 2014128315 A1 | 8/2014 |
| WO | WO-2014/118812 A1 | 8/2014 |
| WO | WO-2014/125390 A1 | 8/2014 |
| WO | WO-2014/128315 A1 | 8/2014 |
| WO | 2014167526 A1 | 10/2014 |
| WO | WO-2014/167526 A1 | 10/2014 |
| WO | 2014184651 A1 | 11/2014 |
| WO | 2014184652 A1 | 11/2014 |
| WO | 2014184653 A1 | 11/2014 |
| WO | WO-2014/184651 A1 | 11/2014 |
| WO | WO-2014/184652 A1 | 11/2014 |
| WO | WO-2014/184653 A1 | 11/2014 |
| WO | 2014191412 A1 | 12/2014 |
| WO | 2014191413 A1 | 12/2014 |
| WO | 2014198474 A1 | 12/2014 |
| WO | 2014202105 A1 | 12/2014 |
| WO | WO-2014/191412 A1 | 12/2014 |
| WO | WO-2014/191413 A1 | 12/2014 |
| WO | WO-2014/198474 A1 | 12/2014 |
| WO | WO-2014/202105 A1 | 12/2014 |
| WO | 2015011683 A1 | 1/2015 |
| WO | WO-2015/011683 A1 | 1/2015 |
| WO | 2015056202 A1 | 4/2015 |
| WO | WO-2015/056202 A1 | 4/2015 |
| WO | 2015075584 A1 | 5/2015 |
| WO | WO-2015/075584 A1 | 5/2015 |
| WO | 2015082982 A1 | 6/2015 |
| WO | 2015087180 A1 | 6/2015 |
| WO | WO-2015/082982 A1 | 6/2015 |
| WO | WO-2015/087180 A1 | 6/2015 |
| WO | 2015101394 A1 | 7/2015 |
| WO | 2015104171 A1 | 7/2015 |
| WO | 2015104172 A1 | 7/2015 |
| WO | WO-2015/101394 A1 | 7/2015 |
| WO | WO-2015/104171 A1 | 7/2015 |
| WO | WO-2015/104172 A1 | 7/2015 |
| WO | 2015128527 A1 | 9/2015 |
| WO | 2015128799 A1 | 9/2015 |
| WO | 2015128827 A1 | 9/2015 |
| WO | WO-2015/128527 A1 | 9/2015 |

(56) References Cited

FOREIGN PATENT DOCUMENTS

| WO | WO-2015/128799 A1 | 9/2015 |
| WO | WO-2015/128827 A1 | 9/2015 |
| WO | 2015180960 A1 | 12/2015 |
| WO | WO-2015/180960 A1 | 12/2015 |
| WO | 2016041596 A1 | 3/2016 |
| WO | WO-2016/041596 A1 | 3/2016 |
| WO | 2016074189 A1 | 5/2016 |
| WO | 2016186488 A1 | 11/2016 |
| WO | 2016186489 | 11/2016 |
| WO | 2016186489 A1 | 11/2016 |
| WO | 2016186491 | 11/2016 |
| WO | 2016186491 A1 | 11/2016 |
| WO | 2016186492 | 11/2016 |
| WO | 2016186492 A1 | 11/2016 |
| WO | 2016186496 | 11/2016 |
| WO | 2016186496 A1 | 11/2016 |
| WO | 2017074189 | 5/2017 |
| WO | 2017074189 A1 | 5/2017 |

OTHER PUBLICATIONS

International Preliminary Report on Patentability, PCT/NL2016/050341, Koninklijke Douwe Egberts B.V., 8 pages (dated Nov. 21, 2017).
International Preliminary Report on Patentability, PCT/NL2016/050342, Koninklijke Douwe Egberts B.V., 8 pages (dated Nov. 21, 2017).
International Preliminary Report on Patentability, PCT/NL2016/050344, Koninklijke Douwe Egberts B.V., 8 pages (dated Nov. 21, 2017).
International Preliminary Report on Patentability, PCT/NL2016/050346, Koninklijke Douwe Egberts B.V., 7 pages (dated Nov. 21, 2017).
International Preliminary Report on Patentability, PCT/NL2016/050349, 7 pages (dated Nov. 21, 2017).
International Preliminary Report on Patentability, PCT/NL2016/050350, Koninklijke Douwe Egberts B.V., 8 pages (dated Nov. 21, 2017).
International Preliminary Report on Patentability, PCT/NL2016/050749, Koninklijke Douwe Egberts B.V., 7 pages (dated May 1, 2018).
International Preliminary Report on Patentability, PCT/NL2017/050663, 7 pages (dated Apr. 9, 2019).
International Search Report and Written Opinion, PCT/NL2016/050341, Koninklijke Douwe Egberts B.V., 13 pages (dated Oct. 27, 2016).
International Search Report and Written Opinion, PCT/NL2016/050342, Koninklijke Douwe Egberts B.V., 13 pages (dated Nov. 8, 2016).
International Search Report and Written Opinion, PCT/NL2016/050344, Koninklijke Douwe Egberts B.V., 13 pages (dated Oct. 27, 2016).
International Search Report and Written Opinion, PCT/NL2016/050346, Koninklijke Douwe Egberts B.V., 12 pages (dated Nov. 10, 2016).
International Search Report and Written Opinion, PCT/NL2016/050350, Koninklijke Douwe Egberts B.V., 13 pages (dated Nov. 2, 2016).
International Search Report and Written Opinion, PCT/NL2016/050749, Koninklijke Douwe Egberts B.V., 10 pages (dated Feb. 22, 2017).
International Search Report and Written Opinion, PCT/NL2017/050300, 13 pages (dated Jul. 19, 2017).
International Search Report and Written Opinion, PCT/NL2017/050301, 15 pages (dated Jul. 19, 2017).
International Search Report and Written Opinion, PCT/NL2017/050659, 12 pages (dated Jan. 17, 2018).
International Search Report and Written Opinion, PCT/NL2018/050486, 14 pages (dated Oct. 18, 2018).
Notice of Opposition, dated Jan. 24, 2020 for EP Application No. 16744560.0, 41 pages.
Nullity Action on DE 202016106171.7, 96 pages (dated Dec. 20, 2019).
International Search Report and Written Opinion, PCT/NL2017/050663, 12 pages (dated Jan. 17, 2018).

CAPSULE, A SYSTEM FOR PREPARING A POTABLE BEVERAGE

CROSS-REFERENCE TO RELATED APPLICATIONS

This application is a National Stage Application of PCT/NL2017/050663, filed Oct. 9, 2017, which claims the benefit of and priority to Netherlands Patent Application No. NL 2017592, filed Oct. 7, 2016, the entire contents of both are hereby incorporated herein by reference.

The invention relates to a capsule containing a substance for the preparation of a potable beverage by extracting and/or dissolving the substance by means of supplying a fluid under pressure into the capsule, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with an enclosing member of a beverage preparation device if the capsule is positioned in the enclosing member of the beverage preparation device and the enclosing member is closed by means of a closing member of the beverage preparation device, such as an extraction plate of the beverage preparation device, such that the outwardly extending flange of the capsule and at least a portion of the sealing member of the capsule are sealingly engaged between the enclosing member and the closing member of the beverage preparation device, wherein the enclosing member of the beverage preparation device comprises an annular element having a central annular element axis and a free contact end, the free contact end of the annular element optionally being provided with a plurality of racially extending open grooves.

The invention also relates to a system for preparing a potable beverage from a capsule using a fluid supplied under pressure into the capsule comprising:
  a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, the free contact end of the annular element optionally being provided with a plurality of racially extending open grooves;
  a capsule containing a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device.

Furthermore the invention relates to the use of a capsule in a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, the free contact end of the annular element optionally being provided with a plurality of radially extending open grooves; wherein the capsule contains a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device.

Such a capsule, system and use are known from EP-B-1 700 548. In the known system the capsule is provided with a sealing member having the shape of a step, i.e. a sudden increase of the diameter of the side wall of the capsule, and the enclosing member of this known system has a sealing surface acting on the sealing member to provide deflection of the sealing member, the sealing surface being inclined so that the deflection of the sealing member is an inwards and downwards deformation of the step. Furthermore in the known system the enclosing member comprises a capsule holder and a manually operated or an automatic mechanism for relative displacement of the enclosing member and the capsule holder. The manually operated or an automatic mechanism applies a force on the sealing member of the capsule when the enclosing member closes on the capsule holder. This force should ensure the fluid tight seal between the enclosing member and the capsule. Because the manually operated or an automatic mechanism is arranged to be moved relative to the base, the sealing capabilities of the system can depend on the pressure of the fluid injected by the fluid injection means. If the pressure of the fluid increases, the force between the sealing member of the capsule and the free end of the enclosing member increases too and thereby the force between the sealing member of the capsule and the free end of the enclosing member increases also. Such a system is described further on. The sealing member of the capsule must be arranged such that upon reaching the maximum fluid pressure in the enclosing member the sealing member should still provide a fluid sealing contact between the enclosing member and the capsule. However, the sealing member must also be arranged such that prior to, or at the start of, brewing when the pressure of the fluid in the enclosing member outside the capsule is relatively low, the sealing member also provides a fluid sealing contact between the enclosing member and the capsule. If at the start of brewing, there would not exist a fluid sealing contact between the capsule and the enclosing member, leakage will occur. However, if leakage occurs there is a real chance that the pressure in the enclosing member and outside the capsule will not sufficiently increase for increasing the force on the sealing member by means of the free end of the enclosing member if the manually operated or an automatic mechanism moves the enclosing member towards the capsule holder. Only if there is a sufficient initial sealing, the pressure in the enclosing member will increase whereby also the force of the free end of the enclosing member acting on the sealing member of the capsule will increase for providing a sufficient fluid sealing contact at also the increased fluid pressure. Moreover, this increased fluid pressure outside the capsule also provides an increased fluid pressure inside the capsule which is essential if the capsule is provided with a cover which is arranged to tear open on relief members of the capsule holder (also called an extraction plate) of the beverage preparation device under the influence of fluid pressure in the capsule.

It follows from the above that the sealing member is a member which is very critical in design. It should be able to provide a fluid sealing contact between the enclosing member and the capsule at a relatively low fluid pressure if only a relatively small force is applied on the sealing member by means of the free end of the enclosing member but it should also provide a fluid sealing contact at a much higher fluid pressure in the enclosing member outside the capsule if a higher force is applied by means of the free end of the enclosing member to the sealing member of the capsule. In particular when the free contact end of the enclosing member is provided with radially extending open grooves which act as air inlet passage once the force between the enclosing member and the capsule holder is released so that it is easier for a user to take out the capsule, the sealing member must also be able to 'close' the radially extending open grooves to provide an effective seal.

It is an object of the invention to provide an alternative sealing member which is relatively easy to manufacture, which is environmentally friendly if the capsule is disposed of after use and/or which provides a satisfactory sealing both at a relatively low fluid pressure if only a relatively small force is applied on the sealing member by means of the free end of the enclosing member (sometimes also called initial seal) and at a much higher fluid pressure if a higher force is applied (e.g. during brewing) by means of the free end of the enclosing member to the sealing member of the capsule, even in case of an enclosing member of which the free contact end is provided with racially extending open grooves.

The invention has also as an object to provide an alternative system for preparing a potable beverage from a capsule and to provide an alternative use of a capsule in a beverage preparation device.

In accordance with the invention there is provided in a first aspect a capsule according to claim 1.

Since the sealing member is integral with the outwardly extending flange and includes an annular projection including a projection top projecting axially towards the capsule body bottom from an inner projection foot radially outside of an inner sealing member portion and an outer projection foot racially inside of an outer flange portion, and wherein the outwardly extending flange includes an annular trough between the inner projection foot and the side wall, the annular trough having a bottom axially spaced from the outer projection foot towards the bottom of the capsule body, the sealing member is relatively easy to manufacture and provides a satisfactory sealing to the free contact end provided with racially extending open grooves. In particular, the bottom of the annular trough axially spaced from the outer projection foot towards the bottom of the capsule body allows the bottom to be pushed towards the closing member relative to the outside of the projection, which causes the projection to be forced inwardly due to tilting and "rolling off" of the projection, thereby increasing the radial contact pressure exerted against the free contact end of the annular element, which contributes to achieving a satisfactory seal.

For stable support of the projection, preferably, the outer flange portion is oriented transverse and preferably perpendicularly to the central capsule body axis. Furthermore, the outer wall of the projection is preferably oriented upwardly from the outer projection foot at an angle of less than 10° and more preferably less than 5° to the central capsule body axis.

In this application the existence of a fluid sealing contact means that 0-6%, preferably 0-4%, more preferably 0-2.5% of the total fluid supplied to the enclosing member for preparing the beverage may leak away due to leakage between the free contact end and the sealing member of the capsule.

Seen in cross-section along a plane through the capsule body axis, the bottom of the trough is preferably continuously substantially straight or curved with a radius of curvature that is larger than (e.g. at least 5 or 10 times) a radius of curvature of transitions to the projection and to the sidewall, so that reaction forces resulting from inward forcing of the projection are effectively transferred.

The straight section of the bottom of the trough is sloping in outward direction with an axial component toward the bottom of the capsule body, so that the substantially straight or lightly curved, in 3-D generally conical, section, effectively acts as a plate spring or spring collar of which an outer portion resiliently exerts an axial counter pressure on the projection, so that axial pressure is evenly distributed in circumferential sense.

The substantially straight section of the bottom of the trough is preferably sloping at an enclosed angle to a plane perpendicular to the capsule body axis between 0 and 10 degrees and more preferably between 3 and 8 degrees or between 4 and 7 degrees.

Seen in cross-section along a plane through the capsule body axis, a transition from the bottom of the trough to the projection preferably has a sloping section that is straighter than adjacent curved sections inside and outside of said sloping section. This also contributes to effectively restraining the projection against moving outward, which would lead to a loss of radial sealing pressure.

The sloping section is preferably oriented at an enclosed angle of at least 10° and more preferably at least 20° and at most and 60° and more preferably at most 50° relative to a plane perpendicular to the capsule body axis.

A radially outer wall of the projection is preferably oriented at an enclosed angle relative to the capsule body axis of less than 8° and more preferably less than 6°. Thus, upper portions of the projection are effectively supported against collapsing and inward "rolling off" of the projection, similar to a deep drawing operation is facilitated. For the same purpose, it is further advantageous if, at the outer foot of the projection, a transition from the projection to a racially outwardly projecting portion of the outwardly extending flange has an internal radius of less than 0.15 mm and preferably less than 0.12 mm. Compressive movement induces plastic buckling of the projection, increasing the contact force applied to the free end of the enclosing member.

Preferably, the outwardly extending flange has no more than one single annular projection comprising a projection top projecting axially towards the bottom from an inner projection foot radially outside of an inner flange portion and an outer projection foot radially inside of an outer flange portion. Thus, the capsule body can be manufactured efficiently, in particular when deep drawing the capsule from plate material.

The invention is in particular advantageous when in an embodiment of a capsule the capsule contains an extractable product as substance for the preparation of a potable beverage, the extractable product preferably being 5-20 grams, preferably 5-10 grains, more preferably 5-7 grams of an extractable product, such as roasted and ground coffee.

In an embodiment of a capsule according to the invention which is in particular easy to manufacture the outer diameter of the outwardly extending flange of the capsule is larger than the diameter of the bottom of the capsule. Preferably, the outer diameter of the outwardly extending flange is approximately 37.1 mm and the diameter of the bottom of the capsule is about 23.3 mm.

The invention is in particular advantageous when in an embodiment of a capsule the thickness of the aluminum capsule body is such that it is deformed easily if the capsule is positioned in the enclosing member of the beverage preparation device and the enclosing member is closed by means of a closing member of the beverage preparation device, preferably the thickness of the aluminum capsule body is 20 to 200 micrometer, preferably 100 micrometer.

The invention is in particular advantageous when in an embodiment of a capsule the thickness of the aluminum cover is 15 to 65 micrometer, preferably 30-45 micrometer and more preferably 39 micrometer.

In an embodiment of a capsule according to the invention the wall thickness of the aluminum cover is smaller than the wall thickness of the aluminum capsule body.

In a further embodiment of a capsule according to the invention the aluminum cover is arranged to tear open on a closing member of the beverage preparation device, such as an extraction plate of the beverage preparation device under the influence of fluid pressure in the capsule.

In an embodiment of a capsule according to the invention which is in particular easy to manufacture the side wall of the aluminum capsule body has a free end opposite the bottom, the outwardly extending flange extending from the free end of the side wall in a direction at least substantially transverse to the central capsule body axis. Preferably, the outwardly extending flange comprises a curled outer edge, which is beneficial in obtaining for a satisfactory sealing with the free contact end provided with radially extending open grooves. The radius about the central capsule body axis of an inner edge of the curled outer edge of the outwardly extending flange is preferably at least 32 mm, so that clearance from the annular end surface of the enclosure member is ensured. It is then preferred that the sealing member is positioned between the free end of the side wall of the aluminum capsule body and an inner edge of the curled outer edge of the outwardly extending flange to obtain a still further satisfactory sealing.

To ensure that the curled outer edge does not interfere with operation of a wide variety of commercially available and future beverage preparation apparatuses, the curled outer edge of the outwardly extending flange has a largest dimension of about 1.2 millimeter.

The invention is in particular beneficial for capsules of which the inner diameter of the free end of the side wall of the aluminum capsule body is about 29.5 mm. The distance between the free end of the side wall of the aluminum capsule body and an outermost edge of the outwardly extending flange can be about 3.8 millimeter. The preferred height of the aluminum capsule body is about 28.4 mm.

In an embodiment of a capsule according to the invention which after use is easier for a user to take out of a beverage preparation device the aluminum capsule body is truncated, wherein preferably the side wall of the aluminum capsule body encloses an angle with a line transverse to the central capsule body axis of about 97.5°.

In an advantageous embodiment of a capsule according to the invention the bottom of the aluminum capsule body has a largest inner diameter of about 23.3 mm. It is preferred that the bottom of the aluminum capsule body is truncated, preferably having a bottom height of about 4.0 mm and that the bottom further has a generally flat central portion opposite the cover having a diameter of about 8.3 mm.

In practically all cases a satisfactory seal can be obtained in an embodiment of a capsule according to the invention in which the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm.

In a preferred embodiment of a capsule according to the invention the capsule comprises an inner surface, and wherein on the inner surface of at least the side wall of the capsule an inner coating is provided. In particular when the capsule is manufactured by deep drawing the inner coating facilitates the deep drawing process. In case the aluminum cover of the capsule is attached to the outwardly extending flange by means of a sealing lacquer it is then in particular advantageous when the inner coating being composed of the same material as the sealing lacquer. In dependence of the inner coating used it is preferred that the sealing member is free from an inner coating in order to prevent crumbling off of the inner coating from the sealing member.

In a further embodiment of a capsule according to the invention the capsule comprises an outer surface, wherein on the outer surface of the capsule a color lacquer is provided. In order to facilitate in deep drawing it is preferred to provide on an outer surface of the color lacquer an outer coating. In dependence of the color lacquer and outer coating used it is preferred that the sealing member is free from a color lacquer (and consequently the outer coating) in order to prevent crumbling off of the color lacquer/outer coating from the sealing member.

The projection, the side wall of the aluminum capsule body and the bottom of the trough can be arranged such that the free contact end of the annular element contacts the bottom of the trough if the capsule is positioned in the enclosing member of the beverage preparation device and the enclosing member is closed by means of a closing member of the beverage preparation device.

For achieving a reliable seal, it is also advantageous if the projection has an extreme top end extending around the capsule axis at a diameter of 31.9 to 32.4 mm. Thus, when used in commercially available coffee making apparatuses such as the Citiz, Lattisima, U, Maestria, Pixie, Inissia and Essenza, an outer edge area of the free end of the enclosing member is firmly pressed against the projection.

In accordance with the invention there is provided, in a second aspect, a system for preparing a potable beverage according to claim 51.

The trough preferably has a radial width that is substantially larger than the radial thickness of the free contact end portion of the annular element, so that a clearance is left between said free contact end portion of the annular element and the side wall of the capsule body. Thus, it is ensured that the full axial force is available for generating a sealing between the enclosing member and the sealing member.

The projection top may constitute a portion of the projection, for instance a half, a third or a quarter of the projection that is axially most distal from the feet of the projection.

Regarding the preferred embodiments of the system as mentioned in the dependent claims which relate to the same features as the features of the dependent claims of the capsule reference is made to the above.

The invention is particularly suitable for use in a system according to the invention wherein, in use, the maximum fluid pressure in the enclosing member of the beverage preparation device is in the range of 6-20 bar, preferably between 12 and 18 bar. Even at such high pressures a satisfactory seal between capsule and beverage preparation device can be obtained.

Preferably the system is arranged such that, in use, during brewing, a free end of the enclosing member of the beverage preparation device exerts a force F2 on the sealing member of the capsule to provide a fluid sealing contact between the outwardly extending flange of the capsule and the enclosing member of the beverage preparation device, wherein F2 is in the range of 500-1500 N preferably in the range of 750-1250 N when the fluid pressure P2 in the enclosing member of the beverage preparation device outside the capsule is in the range of 6-20 bar, preferably between 12 and 18 bar. In particular the system is arranged such that, in use, prior to or at the start of brewing, a free end of the enclosing member of the beverage preparation device exerts a force F1 on the sealing member of the capsule to provide a fluid sealing contact between the outwardly extending flange of the capsule and the enclosing member of the beverage preparation device, wherein F1 is in the range of 30-150 N preferably in the range of 40-150 N, more preferably 50-100 N, when the fluid pressure P1 in the enclosing member of the beverage preparation device outside the capsule is in the range of 0.1-4 bar, preferably between 0.1-1 bar.

In an embodiment of a system according to the invention wherein the plurality of radially extending open grooves are uniformly spaced relative to each other in tangential direction of the free contact end of the annular element of the beverage preparation device so that it is easier for a user to take out the capsule while a satisfactory seal between capsule and beverage preparation device can still be provided.

In an advantageous embodiment of a system according to the invention the longest tangential width of each groove (top to top, i.e. equal to the groove to groove pitch) is 0.9-1.1 mm, preferably 0.95 to 1.05 mm, more preferably 0.98 to 1.02 mm, wherein a maximal height of each groove in an axial direction of the enclosing member of the beverage preparation device is 0.01 -0.09 mm, preferably 0.03 to 0.07 mm, more preferably 0.045 to 0.055 mm, most preferred 0.05 mm and wherein the number of grooves is 90 to 110, preferably 96. The radial width of the annular end surface at the location of the grooves may for instance be 0.05-0.9 mm, preferably 0.2-0.7 mm and more preferably 0.3-0.55 mm. The invention is in particular suitable when applied to an embodiment of a system according to the invention in which during use when the closing member of the beverage preparation device closes the enclosing member of the beverage preparation device at least the free contact end of the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device. The enclosing member may comprise a first part and a second part wherein the second part comprises the free contact end of the enclosing member wherein the second part can move relative to the first part between a first and second position. The second part can move from the first position towards the second position in the direction of the closing member under the influence of fluid pressure in the enclosing member. The force F1 as discussed above may be reached if the second part is in the first position with a fluid pressure P1. The force F2 as discussed above may be reached if the second part is moved towards the second position under the influence of the fluid pressure P2 in the enclosing member.

In accordance with the invention there is provided in a third aspect a use of a capsule according to the invention according to claim 63.

Particular embodiments of the invention are set forth in the dependent claims. Regarding the advantage of the inventive use and the preferred embodiments of the use as mentioned in the dependent claims which relate to the same features as the features of the dependent claims of the capsule or the dependent claims of the system reference is made to the above.

Further features, details and effects of the invention will now be further elucidated by means of, non-limiting, examples referring to the drawing, in which FIG. 1 shows a schematic representation of an embodiment of a system according to the invention;

FIG. 2, in a perspective view, shows an embodiment of a beverage preparation device of a system according to the invention showing the free contact end of the enclosing member of the beverage preparation device with the plurality of racially extending open grooves;

FIG. 3A, in schematic cross section, shows an embodiment of a capsule according to the invention before use;

FIG. 3B schematically shows an enlarged detail of a the capsule of FIG. 3A showing the outwardly extending flange and the sealing member;

FIG. 3C schematically shows an enlarged detail of the outwardly extending flange of the capsule in FIGS. 3A and 3B after use;

Figure 6:
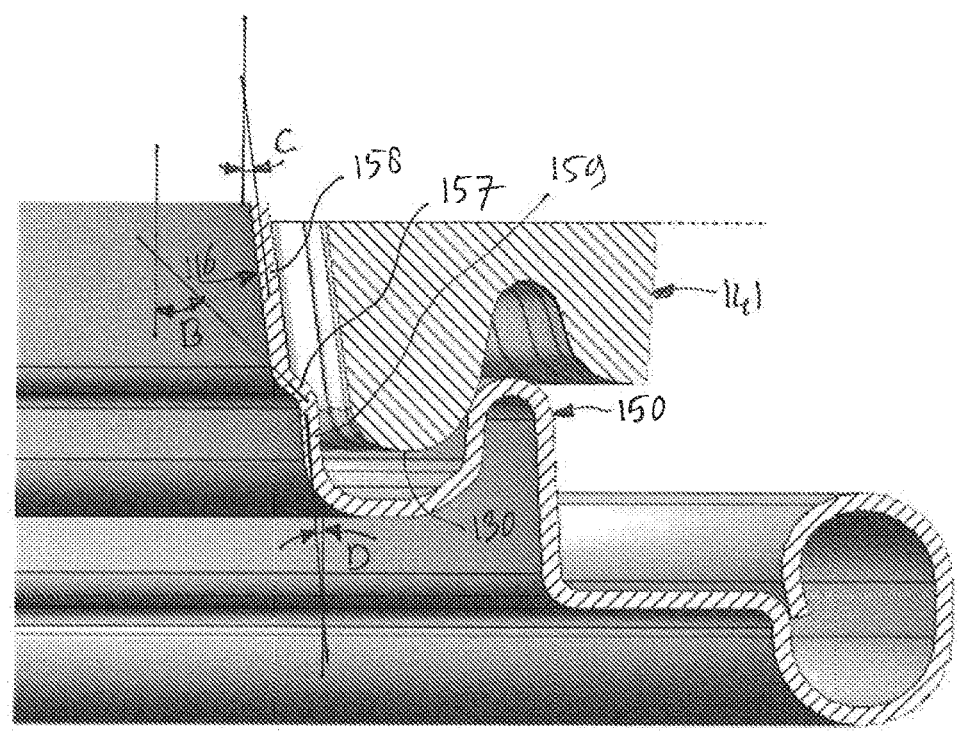
Figure 7:
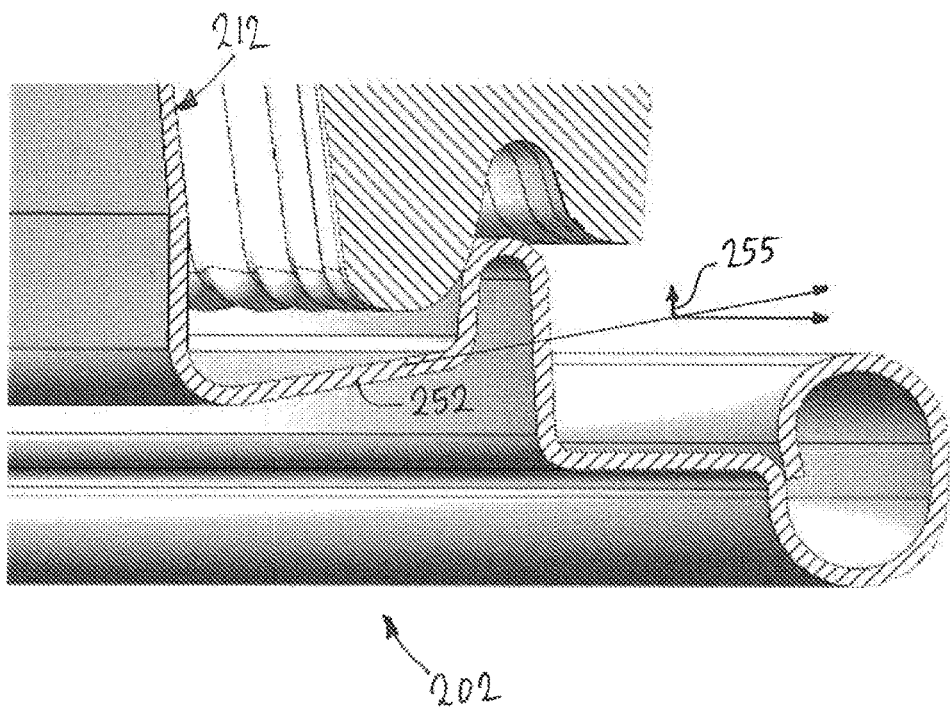

FIG. 6 is an enlarged cross-sectional view of a second embodiment of a sealing member at the outwardly extending flange of a capsule according to the invention in combination with an end portion of the enclosing member and a closing member of a beverage making apparatus; and FIG. 7 is an enlarged cross-sectional view of a third embodiment of a sealing member at the outwardly extending flange of a capsule according to the invention in combination with an end portion of the enclosing member and a closing member of a beverage making apparatus.

In the figures and the following description, like reference numerals refer to like features.

Figure 1:
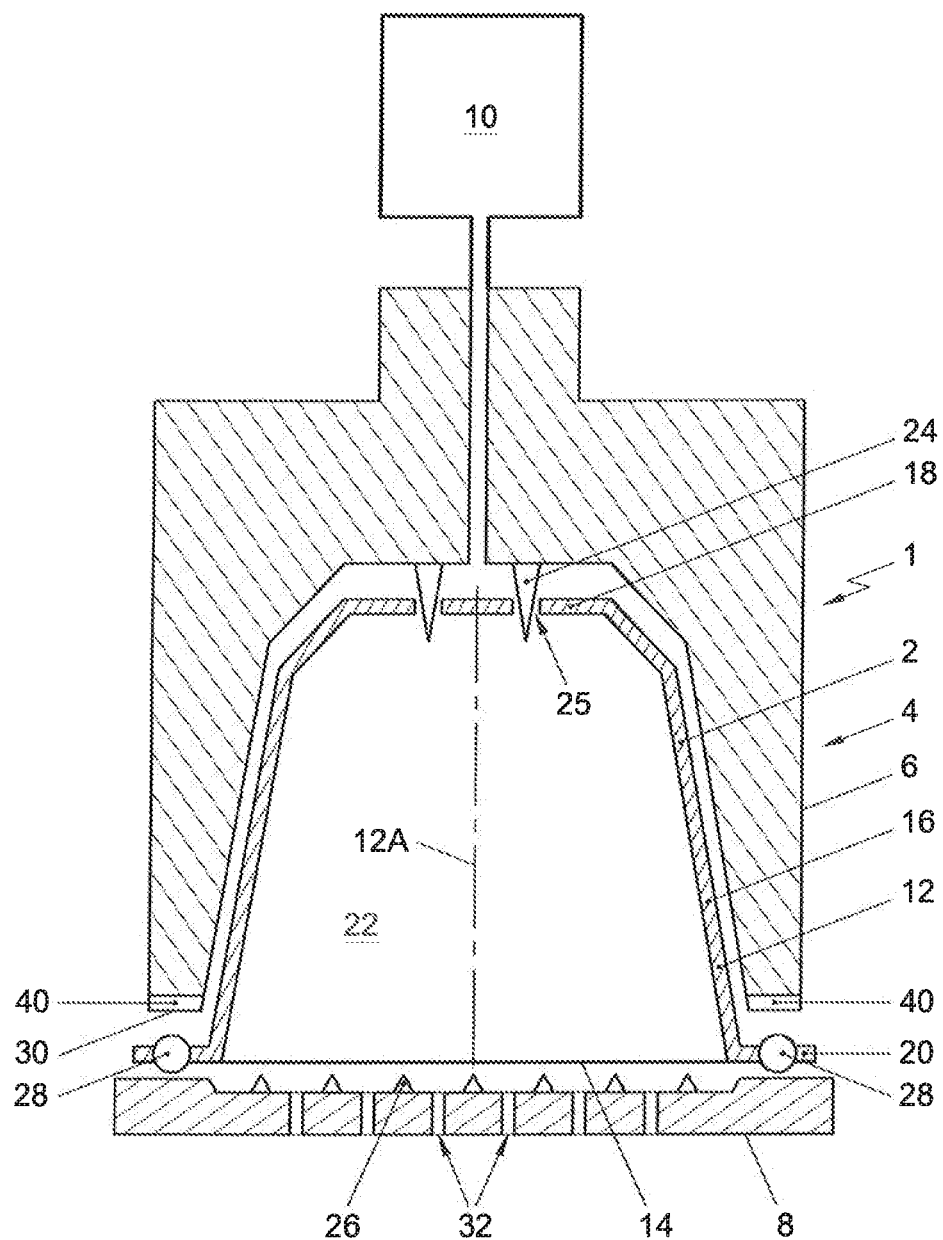

FIG. 1 shows a schematic representation, in cross sectional view, of an embodiment of a system 1 for preparing a potable beverage from a capsule using a fluid supplied under pressure into the capsule. The system 1 comprises a capsule 2, and a beverage preparation device 4. The device 4 comprises enclosing member 6 for holding the capsule 2. The device 4 further comprises a closing member, such as an extraction plate, 8 for supporting the capsule 2.

In FIG. 1 a gap is drawn between the capsule 2, the enclosing member 6 and the extraction plate 8 for clarity. It will be appreciated that, in use, the capsule 2 may lie in contact with the enclosing member 6 and the extraction plate member 8. Commonly, the enclosing member 6 has a shape complementary to the shape of the capsule 2. The beverage preparation device 4 further comprises a fluid injection means 10 for supplying an amount of a fluid, such as water, under a pressure in the range of 6-20 bar, preferably between 12 and 18 bar, to the exchangeable capsule 2.

In the example shown in FIG. 1, the exchangeable capsule 2 comprises an aluminum capsule body 12 having a central capsule body axis 12A and an aluminum cover 14. In the present context, the meaning of 'aluminum' is understood to also include aluminum alloy. In this example, the aluminum capsule body 12 comprises a side wall 16, a bottom 18 closing the side wall 16 at a first end, and a outwardly extending flange 20 extending outwardly of the circumferential wall 16 at a second end opposite the bottom 18. The side wall 16, the bottom 18 and the cover 14 enclose an inner space 22 comprising a substance for the preparation of a potable beverage by extracting and/or dissolving the substance. Preferably the substance is an extractable product for the preparation of a potable beverage, the extractable product preferably being 5-20 grams, preferably 5-10 grams, more preferably 5-7 grams of roasted and ground coffee for the preparation of a single beverage. The capsule is initially sealed, i.e. is hermetically closed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises cover piercing means 26, here embodied as protrusions of the closing member 8, for piercing the cover 14 of the capsule 2. The cover piercing means 26 may be arranged to tear the cover 14 once a (fluid) pressure inside the inner space 22 exceeds a threshold pressure and presses the cover 14 against the cover piercing means 26 with sufficient force. The aluminum cover 14 thus is arranged to tear open on the closing member 8 of the beverage preparation device under the influence of fluid pressure in the capsule.

Figure 3A:
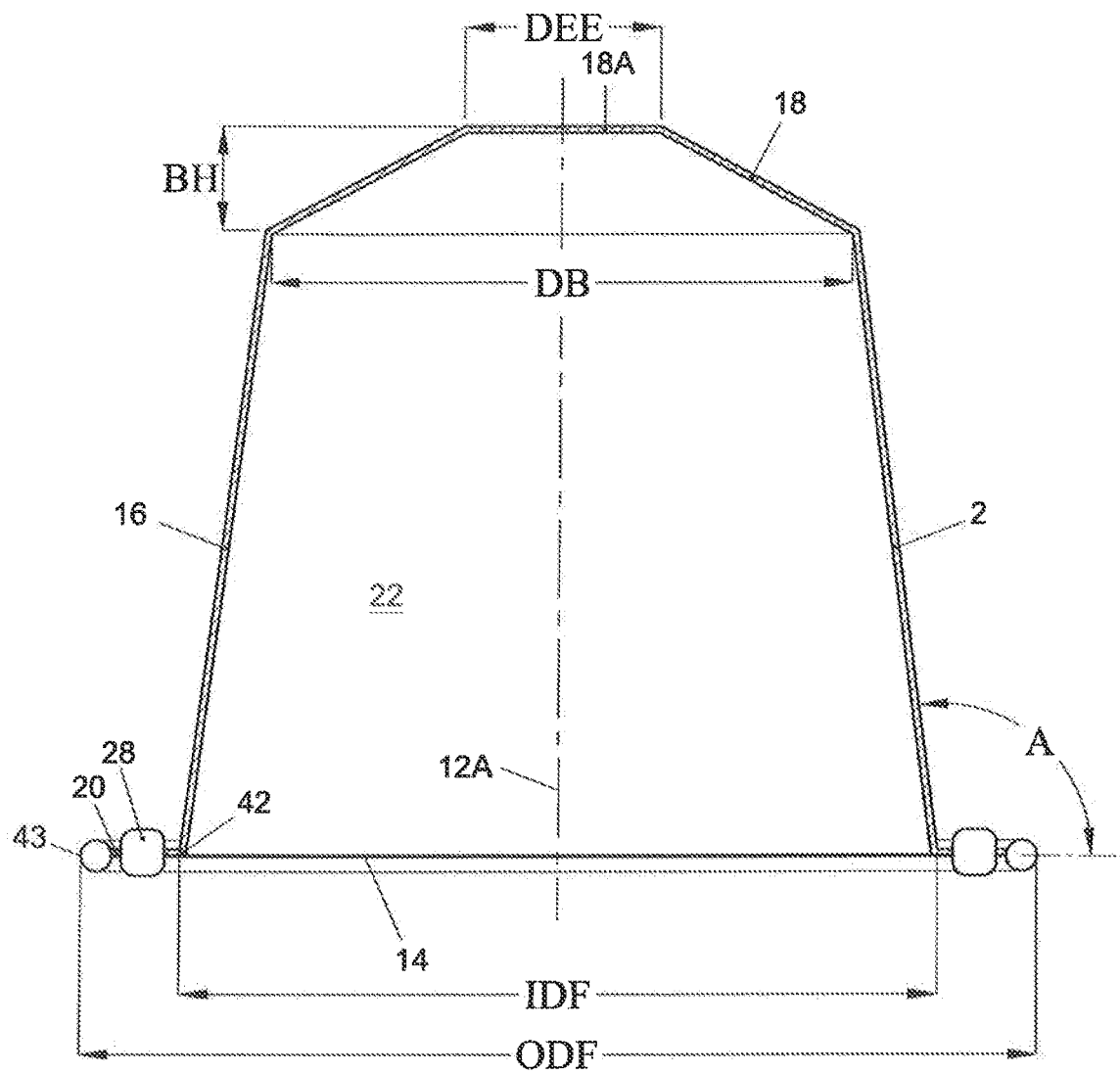
Figure 3B:
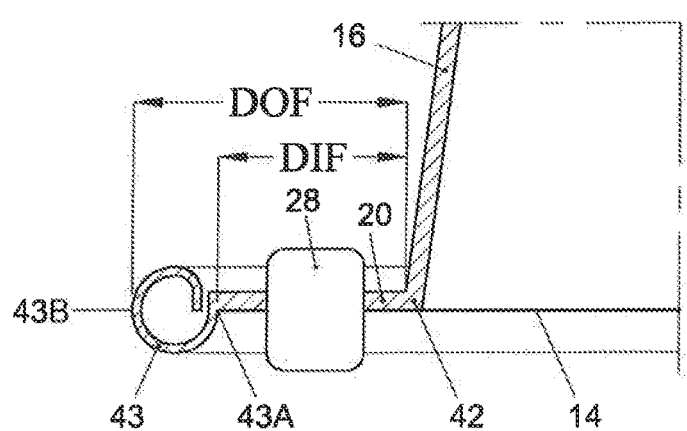

The capsule 2 further comprises a sealing member 28 integral with the outwardly extending flange, in FIGS. 1, 3A and 3B indicated as a general box but more detailed described with regard to FIG. 4, which sealing member 28 is arranged for providing a fluid sealing contact with the enclosing member 6 if the capsule 2 is positioned in the enclosing member 6 and the enclosing member 6 is closed by means of the extraction plate 8, such that the outwardly extending flange 20 of the capsule 2 and at least a portion of the sealing member 28 are sealingly engaged between the enclosing member 6 and the extraction plate 8. This means that a fluid sealing contact between the sealing member 28 and the free contact end is established.

Figure 2:
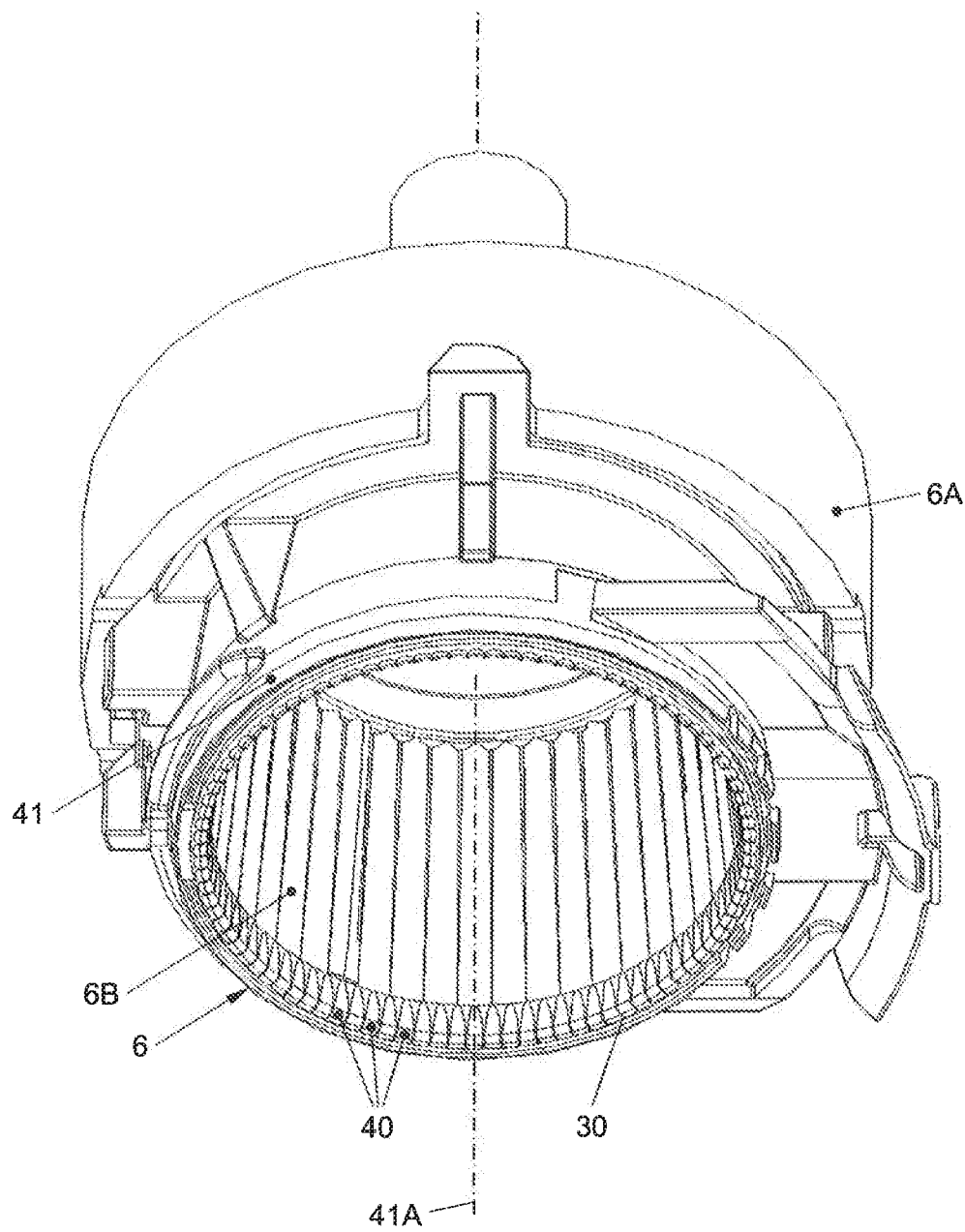

As shown in FIG. 2 the enclosing member 6 of the beverage preparation device comprises an annular element 41 having a central annular element axis 41A and a free contact end 30. The free contact end 30 of the annular element 41 is provided with a plurality of radially extending open grooves 40. The plurality of racially extending open grooves 40 are uniformly spaced relative to each other in tangential direction of the free contact end 30 of the annular element 41. The longest tangential width of each groove 40 is 0.9-1.1 mm, preferably 0.95 to 1.05 mm, more preferably 0.98 to 1.02 mm, wherein a maximal height of each groove 40 in an axial direction of the enclosing member 6 is 0.01-0.09 mm, preferably 0.03 to 0.07 mm, more preferably 0.045 to 0.055 mm, and most preferred 0.05 mm. The number of grooves 40 lies in the range of 90 to 110, preferably 96. Usually, the radial width of the free end at the location of the grooves is 0.05-0.9 mm, more specifically 0.2-0.7 mm, more specifically 0.3-0.55 mm.

An embodiment of a capsule according to the invention is shown more detailed in FIGS. 3A and 3B. In the shown embodiment the outer diameter ODF of the outwardly extending flange 20 is larger than the diameter DB of the bottom 18 of the capsule 2. In the shown embodiment the outer diameter ODF of the outwardly extending flange 20 is approximately 37.1 mm and the diameter DB of the bottom 18 is about 23.3 mm. The thickness of the aluminum capsule body 12 is such that it is deformed easily if the capsule is positioned in the enclosing member of the beverage preparation device and the enclosing member is closed by means of a closing member of the beverage preparation device, preferably the thickness of the aluminum capsule body is 100 micrometer, but in other embodiments the thickness can be 20 to 200 micrometer.

In the shown embodiment, the wall thickness of the aluminum cover 14 is 39 micrometer. The wall thickness of the aluminum cover 14 is preferably smaller than the thickness of the aluminum capsule body 12.

The side wall 16 of the aluminum capsule body 12 has a free end 42 opposite the bottom 18. The inner diameter IDF of the free end 42 of the side wall 16 of the aluminum capsule body 12 is about 29.5 mm. The outwardly extending flange 20 extends from that free end 42 in a direction at least substantially transverse to the central capsule body axis 12A. The outwardly extending flange 20 comprises a curled outer edge 43 which is beneficial for obtaining a seal between the capsule and the enclosing member. In the shown embodiment the curled outer edge 43 of the outwardly extending flange 20 has a largest dimension of about 1.2 millimeter. The distance DIF between the free end 42 of the side wall 16 of the aluminum capsule body 12 and an inner edge 43A of the curled outer edge 43 is about 2.7 mm, while the distance DOF between the free end 42 of the side wall 16 of the aluminum capsule body 12 and an outermost edge 43B of the outwardly extending flange 20 is about 3.8 millimeter. The radius about the central capsule body axis of the inner edge 43A of the curled outer edge 43 is preferably at least 32 mm.

As shown in FIGS. 3A and 3B the sealing member 28 is positioned between the free end of the side wall 16 of the aluminum capsule body 12 and the inner edge 43A of the curled outer edge 42 of the outwardly extending flange. The sealing member 28 is indicated as a general box, but will be described in more detail below. Irrespective of the embodiment of the sealing member 28 the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm for providing a correct seal.

As can be seen from FIG. 3A the aluminum capsule body 12 is truncated. In the embodiment shown, the side wall 16 of the aluminum capsule body 12 encloses an angle A with a line transverse to the central capsule body axis 12A of about 97.5°. The bottom 18 of the aluminum capsule body 12 has a largest inner diameter DB of about 23.3 mm. The bottom 18 of the aluminum capsule body 12 is also truncated, and in the shown embodiment has a bottom height BH of about 4.0 mm. The bottom 18 further has a generally flat central portion 18A opposite the cover 14, which central portion 18A has a diameter DEE of about 8.3 mm and in which central portion 18A the entrance opening(s) 25 may be made. The entrance openings may also be made in the truncated portion between the central portion 18A and the side wall 16. The total height TH of the aluminum capsule body 12 of the capsule is about 28.4 mm.

The system 1 shown in FIG. 1 is operated as follows for preparing a cup of a potable beverage, in the present example coffee, wherein the substance is roasted and ground coffee.

The capsule 2 is placed in the enclosing member 6. The extraction plate 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the cover 14 to deform and be pressed against the lid piercing means 26 of the extraction plate. Once the pressure reaches a certain level, the tear strength of the cover 14 will be surpassed and the cover 14 will rupture against the lid piercing means 26, creating exit openings. The prepared coffee will drain from the capsule 2 through the exit openings and outlets 32 (see FIG. 1) of the extraction plate 8, and may be supplied to a container such as a cup (not shown).

The system 1 is arranged such that prior to or at the start of brewing, the free end 30 of the enclosing member 6 exerts a force F1 on the sealing member 28 of the capsule 2 to provide a fluid sealing contact between the outwardly extending flange 20 of the capsule 2 and the enclosing member 6 of the beverage preparation device, wherein F1 is in the range of 30-150 N preferably 40-150 N, more preferably 50-100 N, when the fluid pressure P1 in the enclosing member of the beverage preparation device outside the capsule is in the range of 0.1-4 bar, preferably 0.1-1 bar. During brewing, the free end 30 of the enclosing member 6 exerts a force F2 on the sealing member 28 of the capsule 2 to provide a fluid sealing contact between the outwardly extending flange 20 of the capsule 2 and the enclosing member 6, wherein the force F2 is in the range of 500 -1500 N, preferably in the range of 750-1250 N, when the fluid pressure P2 in the enclosing member 6 of the beverage preparation device outside the capsule 2 is in the range of 6-20 bar, preferably between 12 and 18 bar. In the shown embodiment the free contact end of enclosing member 6 can move relative to the extracting plate 8 under the effect of the pressure of the fluid in the enclosing member 6 device towards the extraction plate 8 for applying the maximum force F2 between the outwardly extending flange 20 and the free end 30 of the enclosing member 6. This movement can take place during use, i.e. in particular at the start of brewing and during brewing. The enclosing member 6 has a first part 6A and a second part 6B wherein the second part comprises the free contact end 30. The second part 6B can move relative to the first part 6A between a first and second position. The second part 6B can move from the first position towards the second position in the direction of the closing member 8 under the influence of fluid pressure in the enclosing member 6. The force F1 as discussed above may be reached if the second part 6B is in the first position with a fluid pressure Pl. The force F2 as discussed above may be reached if the second part 6B is moved towards the second position under the influence of the fluid pressure P2 in the enclosing member 6.

Figure 3C:
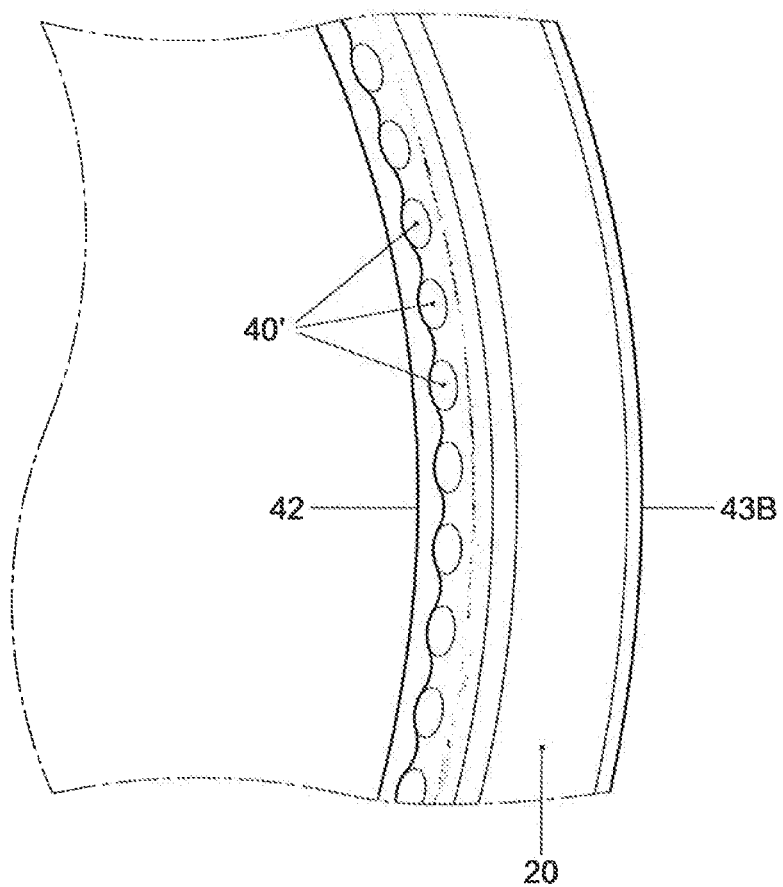

As a result of the force applied the sealing member 28 of the capsule according to the invention undergoes a plastic deformation and closely conforms to the grooves 40 of the free contact end 30 and thus provides a fluid sealing contact between the enclosing member 6 and the capsule 3 at a relatively low fluid pressure during start up of brewing but also provides a fluid sealing contact at the much higher fluid pressure in the enclosing member outside the capsule during brewing. This close conformation to the grooves 40 of the enclosing member is indicated in FIG. 3C which shows the capsule 2 of the invention after use, and which clearly indicates that the outwardly extending flange 20 comprises deformations 40' which conform to the grooves 40 of the enclosing member.

Now an embodiment of a sealing member 28 at the outwardly extending flange 20 of the capsule 2 according to the invention will be described in more detail with regard to FIG. 4.

Figure 4A:
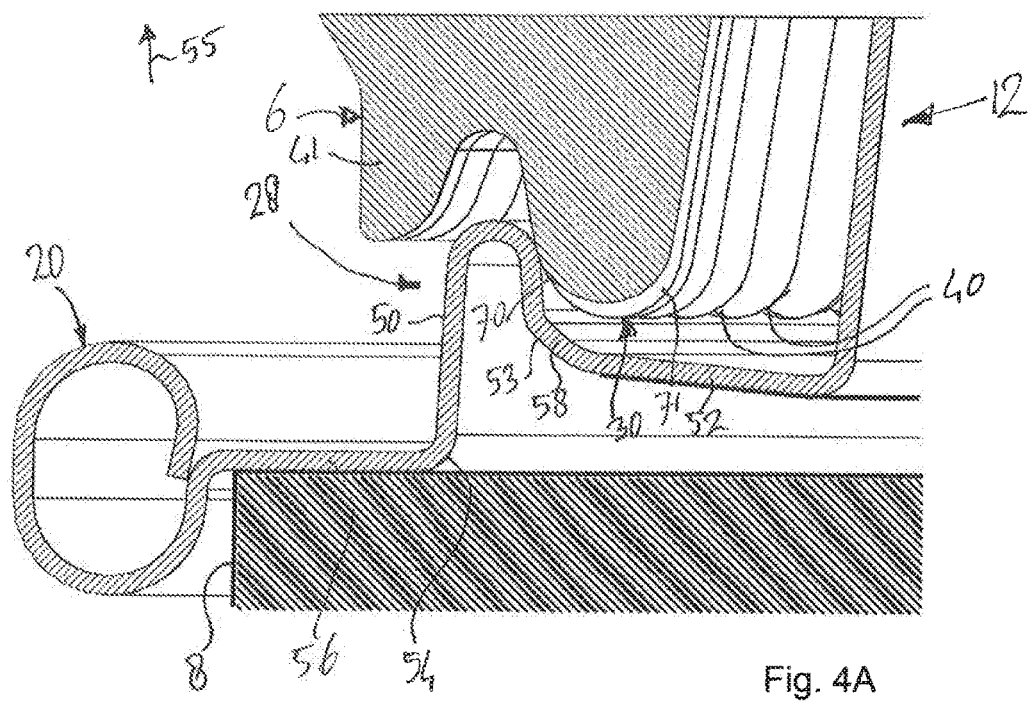
FIG. 4A is an enlarged cross-sectional view of an embodiment of a sealing member at the outwardly extending flange of a capsule according to the invention in combination with an end portion of the enclosing member and a closing member of a beverage making apparatus.

FIG. 4A shows a first embodiment of a sealing member 28 forming an additional bearing at the outwardly extending flange 20 of a capsule body 12. The sealing member 28 and the remainder of the capsule body 12 are made of the same plate material. The sealing member 28 has a projection 50, projecting axially from inner and outer foot portions 53, 54 in an axial direction 55 towards the bottom of the capsule body 12. A trough having a bottom 52 is located inwardly adjacent to the projection 50. The bottom 52 of the trough is positioned at axially distance from the outer foot 54 of the projection 50 in the direction 55 of the bottom of the capsule body 12 and also from a portion 56 of the outwardly extending flange 20 between the sealing member 28 and the curled edge 43 and is substantially flat.

Further, the projection 50 and the bottom 52 of the trough are arranged such that the free contact end 30 of the annular element 41 is contacted by the bottom 52 of the trough if the capsule is positioned in the enclosing member of the beverage preparation device and the enclosing member is closed.

The distance between the projection 50 and a side wall 16 of the capsule body 12 is preferably 0.9-1.25 mm, which allows the inner ridge 60 of the enclosing member 6 of widely used and commercially available beverage preparation devices (such as the Citiz, Lattisima, U, Maestria, Pixie, Inissia and Essenza) to be reliably squeezed against the projection 50 with the side wall 16 in close proximity thereto, but slightly spaced from the side wall 16.

The projection 50 has a projection top constituting a portion of the projection, for instance a half, a third or a quarter of the projection that is axially most distal from the feet 53, 54 of the projection 50. The projection 50 is configured such that its projection top exerts a racial force on the free contact end 30 of the annular element 41 if the capsule is positioned in the enclosing member 6 of the beverage preparation device and the enclosing member is closed by means of a closing member 8 of the beverage preparation device.

Figure 4B:
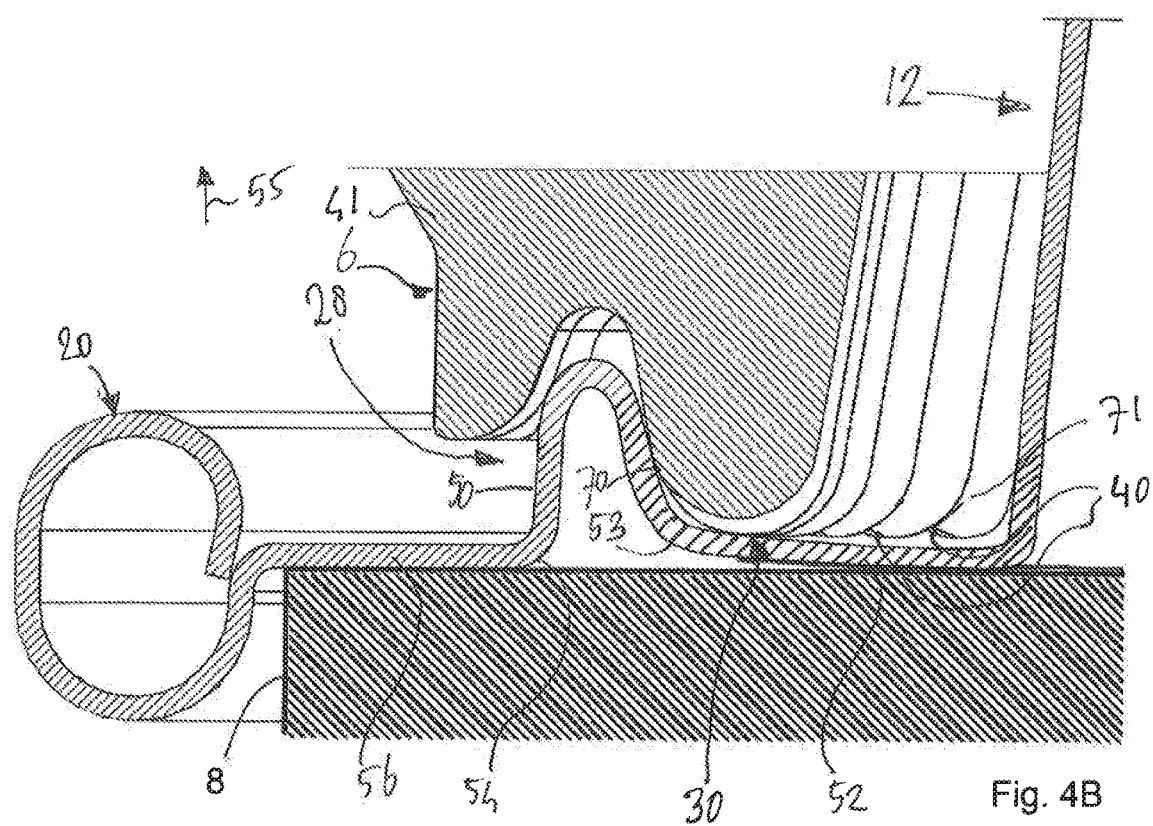
FIG. 4B is a cross-sectional view according to FIG. 4A, with the enclosing member and the closing member in closed positions.

If, as shown in FIG. 4B, the enclosing member 6 and/or the closing member 8 is moved towards the other with the sealing member 28 of the capsule in between, the free contact end 30 of the enclosing member 6 contacts the projections 50. This causes the capsule to be centered relative to the enclosing member 6. The relatively large stiffness of the projection 50, allows a large contact force to be exerted as it is deformed, the relatively high counter pressure provides a particularly reliable seal with high pressure resistance. Also, as the projection 50 is urged outwardly, the exerted load is counteracted by hoop stress in the projection 50, which is evenly distributed circumferentially so that an evenly distributed sealing pressure is achieved.

As can also be seen from FIG. 4B, the free contact end 30 of the enclosing member 6 has an inner circumferential surface portion 71 and an outer circumferential surface portion 70 contacting the projection 50. The radially extending open grooves 40 are deeper in the inner surface portion 71 than in the outer surface portion 70 or the grooves may be absent in the outer surface portion 70. Thus, the projection 50 is firmly and accurately pressed against the relatively smooth outer surface portion 70 of the free contact end 30.

As can be seen from FIG. 4B, since the bottom 52 of the annular trough is axially spaced from the outer projection foot 54 in an axial direction 55 towards the bottom of the capsule body 12, the bottom 52 can be pushed towards the closing member 8 relative to the outside foot 54 of the projection, which causes the projection 50 to be forced inwardly due to tilting and "rolling off" of the projection 50, thereby increasing the radial contact pressure exerted against the free contact end 30 of the annular element 41.

In the first stage contact between the annular element 6 and the sealing member 28 is established an initial seal is created between a generally inwardly facing surface portion of the projection 50 and an outer surface portion 70 of the free end 30 of the annular element 6. The radial location of this inwardly facing surface portion of the projection 50 and the local radius of curvature of the projection 50 are arranged to ensure that the faces contacting each other are oriented almost vertically. This allows a very strong wedging effect to be achieved, so that a very small vertical closing force results in very large horizontal contact pressures. These large horizontal forces are exerted with little deformation of the outer projection 50, because the reaction forces generated by the surface contact are contained mainly by hoop stress in the projection 50. Also, such hoop stresses are largely independent of the remainder of the sealing member 28, so that high stiffness for exerting a large sealing force can be combined with flexibility to accommodate to tolerances and misplacement of the capsule.

In the second stage, the closure and further compression of the brew chamber onto the sealing ring is supported by the build-up of hydraulic pressure. As the compressive force builds, the bottom 52 of the annular trough is pushed downwards by the mechanical and hydraulic loading and the projection 50 pivots about an outer foot 54 of the projection 50 and rolls off inwardly until the bottom 52 of the annular through 55 touches the cover as is shown in FIG. 4B. This pivoting and rolling movement results in both a 'rigid body' type motion of the sealing member 28 as well as deformation of the sealing member shape, both factors result in addition contact pressure being transferred to the primary sealing face. Since much of the deformation occurs plastically, the contact region conforms effectively to sealing area and allows some misalignment and manufacturing tolerances to be accommodated.

In the third stage, a further increase of the axial (here vertical) force causes a slight further deformation of the sealing member 28. In the present embodiment a reliably very leak-tight seal at a high pressure drop at high contact pressure is obtained by deformation of a sloping section 58 at the inner projection foot 53 forming a transition from the projection 50 to the bottom 52 of the trough, which section 58 constitutes a relatively straight section between more curved sections of the bottom of the trough 52 and of the outer projection 50. Such deformation results in a particularly high contact pressure along a narrow line between the projection 50 and the outer surface portion 70 of the free end 30 of the annular element 6. The sloping section 58 is preferably oriented at an enclosed angle of at least 10° and more preferably at least 20° and at most and 60° and more preferably at most 50° relative to a plane perpendicular to the capsule body axis.

Seen in cross-section along a plane through the capsule body axis, the bottom 52 of the trough is continuously substantially straight, so that reaction forces resulting from inward forcing of the projection 50 are effectively transferred.

The straight section of the bottom 52 of the trough, which may also be slightly curved, is sloping in outward direction with an axial component 55 toward the bottom of the capsule body 12, so that the straight, effectively conical section, effectively acts as a plate spring or spring collar of which an outer portion resiliently exerts an axial counter pressure on the projection 50, so that axial pressure is evenly distributed in circumferential sense. The substantially straight section of the bottom 52 of the trough is preferably sloping at an enclosed angle to a plane perpendicular to the capsule body axis between 0 and 10 degrees.

In the present example, the bottom 52 of the trough is axially spaced from the cover 14, which is attached to an annular flange portion on the outside of the projection 50. This (preferably aluminum) cover 14 also contributes to retaining the projection 50 axially inwards against racially outward forces exerted thereon by the free end 30 of the enclosing member 6. This effect may also be achieved if the cover is attached to the bottom of the trough, via which the projection is then additionally retained axially inwards against racially outward forces exerted thereon by the free end 30 of the enclosing member 6. An advantage of the latter solution is that the substance inside the capsule is prevented from entering between the bottom of the trough and the cover.

A radially outer wall of the projection 50 is oriented is substantially parallel to the capsule body axis, so that upper portions of the projection 50 are effectively supported against collapsing and inward "rolling off" of the projection 50, similar to a deep drawing operation is facilitated. For the same purpose, it is further advantageous if, at the outer foot 53 of the projection 50, a transition from the projection to a radially outwardly projecting portion 56 of the outwardly extending flange 20 has a small internal radius, e.g. of less than 0.15 mm and preferably less than 0.12 mm.

Since the outwardly extending flange 20 has no more than one single annular projection, the capsule body 12 can be manufactured efficiently, in particular when deep drawing the capsule from plate material.

Figure 5:
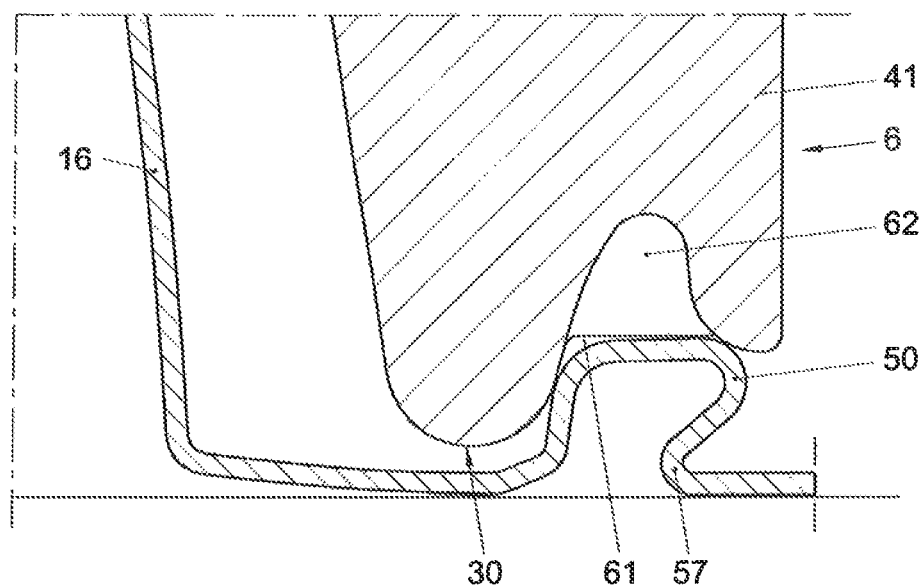
FIG. 5 is a schematical cross-section view of a deformed flange portion and a portion of an enclosing member where a bridge is present between inner and outer rims of a free end of the enclosing member.

In particular in connection with the final mutual displacement of the annular element 6 and the sealing member 28, a particular issue is that, in practice, most annular elements have one or more bridges 61 (FIG. 5) between outer and inner ridges 59, 60 of the annular element 41. Such bridges 61 constitute an interruption of an annular head space 62 into which the projection 50 is wedged during the third stage. Leakage in particular at the transitions where, in circumferential sense, the bridge 61 begins and ends is diminished since the projection 50 is shaped to roll and buckle radially outwards, so that excess sealing member material is locally displaced away from the seal between the projection 50 and the annular element 6, thereby reducing interference with this seal and allowing a substantially continuous seal along a line passing underneath the bridge 61.

In FIG. 6, a second example of a capsule according to the invention is shown. The side wall 116 is provided with a centration shoulder 157 between an upper portion 158 of the sidewall 116 above the shoulder 157 and a lower portion 159 of the sidewall 116 below the shoulder 157. The lower 158 portion of the sidewall 116 is located racially inwardly opposite of the projection 150. The shoulder 157 has an obliquely outwardly and upwardly facing shoulder surface oriented at a larger angle B relative to the central capsule body axis than the angle C and D between the central capsule body axis and the upper and lower side wall portions 158, 159.

The outwardly and upwardly facing surface of shoulder 157 is preferably oriented relative to the central capsule body axis at an angle B of at least 30° and more preferably at least 40°, so that shifting of the capsule 102 over a substantial distance can be achieved over a limited axial displacement of the free contact end 130 of the annular element 141 relative to the capsule 102.

In FIG. 7, a third example of a capsule 202 according to the invention is shown, which differs from the capsule shown in FIG. 6 in that, as in the first example, seen in cross-section along a plane through the capsule body axis, the bottom 252 of the trough is continuously substantially straight and the straight section of the bottom 252 of the trough, which may also be slightly curved, is sloping in outward direction with an axial component 255 toward the bottom of the capsule body 212.

In the foregoing specification, the invention has been described with reference to specific examples of embodiments of the invention. It will, however, be evident that various modifications and changes may be made therein without departing from the broader spirit and scope of the invention as set forth in the appended claims.

The invention claimed is:
1. A capsule containing a substance for the preparation of a potable beverage by extracting or dissolving the substance by means of supplying a fluid under pressure into the capsule, wherein the capsule comprises:

an aluminum capsule body having a central capsule body axis, said aluminum capsule body being provided with a bottom, a side wall and an outwardly extending flange, an aluminum cover attached to the outwardly extending flange, the cover hermetically closing the capsule, a sealing member at the outwardly extending flange for providing a fluid sealing contact with an enclosing member of a beverage preparation device when the capsule is positioned in the enclosing member of the beverage preparation device and the enclosing member is closed by means of a closing member of the beverage preparation device, such that the outwardly extending flange of the capsule and at least a portion of the sealing member of the capsule are sealingly engaged between the enclosing member and the closing member of the beverage preparation device, wherein the enclosing member of the beverage preparation device comprises an annular element having a central annular element axis and a free contact end, wherein the sealing member is integral with the outwardly extending flange and comprises an annular projection comprising a projection top projecting axially towards the capsule body bottom from an inner projection foot radially outside of an inner flange portion and an outer projection foot radially inside of an outer flange portion, and wherein the outwardly extending flange comprises an annular trough between the inner projection foot and the side wall, the annular trough having a bottom axially spaced from the outer projection foot towards the bottom of the capsule body, wherein an outer wall of the projection is oriented upwardly from the outer projection foot at an angle of less than 10° and preferably less than 5° to the central capsule body axis, and wherein the outer flange portion is oriented transverse and preferably perpendicularly to the central capsule body axis, wherein the outwardly extending flange has no more than one single annular projection, wherein a projection top end extends around the capsule body axis at a diameter of 31.9 to 32.4 mm, wherein the bottom of the trough is axially spaced from the cover, wherein the sealing member is deformable such that, in use, closure of the enclosing member causes the axial spacing between the outer projection foot and the bottom of the trough to be reduced, wherein the thickness of the aluminum capsule body is such that it is deformed easily if the capsule is positioned in the enclosing member of the beverage preparation device and the enclosing member is closed by means of the closing member of the beverage preparation device, wherein the thickness of the aluminum capsule body is 20 to 200 micrometer, more preferably 100 micrometer, wherein the aluminum cover is arranged to tear open on the closing member of the beverage preparation device, wherein the outwardly extending flange comprises a curled outer edge, wherein the height of the sealing member portion to be contacted first by the free contact end of the enclosing member when the enclosing member is closed is at least 0.8 mm and at most 2 mm, and wherein the sealing member and the remainder of the capsule body are made of the same plate material.

2. The capsule according to claim 1, wherein, seen in cross-section along a plane through the capsule body axis, the bottom of the trough is continuously substantially straight or curved with a radius of curvature that is larger than a radius of curvature of transitions to the projection and to the sidewall.

3. The capsule according to claim 2, wherein the bottom of the trough is continuously substantially straight and the straight section of the bottom of the trough is sloping in outward direction with an axial component toward the bottom of the capsule body.

4. The capsule according to claim 3, wherein the bottom is sloping at an enclosed angle to a plane perpendicular to the capsule body axis between 0 and 10 degrees.

5. The capsule according to claim 1, wherein, seen in cross-section along a plane through the capsule body axis, a transition from the bottom of the trough to the projection has a sloping section that is straighter than adjacent curved sections inside and outside of said sloping section.

6. The capsule according to claim 5, wherein the sloping section is oriented at an enclosed angle of at least 10° and more preferably at least 20° and at most and 60° and more preferably at most 50° relative to a plane perpendicular to the capsule body axis.

7. The capsule according to claim 1, wherein the radially outer wall of said projection is oriented at an enclosed angle relative to the capsule body axis of less than 8° and more preferably less than 6°.

8. The capsule according to claim 1, wherein, at the outer foot of the projection, a transition from the projection to a radially outwardly projecting portion of the outwardly extending flange preferably has an internal radius of less than 0.15 mm and more preferably less than 0.12 mm.

9. The capsule according to claim 1, wherein the at least one projection is configured such that its projection top exerts an outward radial force on the free contact end of the annular element if the capsule is positioned in the enclosing member of the beverage preparation device and the enclosing member is closed by means of the closing member of the beverage preparation device.

10. The capsule according to claim 1, wherein the sealing member is deformable such that, in use, closure of the enclosing member causes the axial spacing between the outer projection foot and the bottom of the trough to be eliminated.

11. The capsule according to claim 1, wherein the projection has a generally inwardly facing surface portion extending at an enclosed angle of less than 8° and preferably less than 6° or less than 4° to the capsule body axis.

12. The capsule according to claim 1, wherein the projection and the bottom of the trough are arranged such that the free contact end of the annular element contacts the bottom of the trough if the capsule is positioned in the enclosing member and the enclosing member is closed by means of the closing member.

13. The capsule according to claim 1, wherein the capsule comprises a bearing for the enclosing member if the capsule is positioned in the enclosing member and the enclosing member is closed by means of the closing member, said bearing being formed by at least the projection.

14. The capsule according to claim 1, wherein the projection is shaped to roll and buckle radially outwards if compressed in axial direction, while in contact with an outwardly facing surface of a free contact end of the annular element.

15. The capsule according to claim 1, wherein the capsule contains an extractable product as substance for the preparation of a potable beverage, said extractable product preferably being 5-20 grams, preferably 5-10 grams, more preferably 5-7 grams of roasted and ground coffee.

16. The capsule according to claim 1, wherein the outer diameter of the outwardly extending flange of the capsule is larger than the diameter of the bottom of the capsule.

17. The capsule according to claim 1, wherein the outer diameter of the outwardly extending flange is approximately 37.1 mm and the diameter of the bottom of the capsule is about 23.3 mm.

18. The capsule according to claim 1, wherein the thickness of the aluminum cover is 15 to 65 micrometer, preferably 30-45 micrometer and more preferably 39 micrometer.

19. The capsule according to claim 1, wherein the wall thickness of the aluminum cover is smaller than the wall thickness of the aluminum capsule body.

20. The capsule according to claim 1, wherein the side wall of the aluminum capsule body has a free end opposite the bottom, the outwardly extending flange extending from said free end of the side wall in a direction at least substantially transverse to the central capsule body axis.

21. The capsule according to claim 20, wherein the inner diameter of the free end of the side wall of the aluminum capsule body is about 29.5 mm.

22. The capsule according to claim 20, wherein the distance between the free end of the side wall of the aluminum capsule body and an outermost edge of the outwardly extending flange is about 3.8 millimeter.

23. The capsule according to claim 1, wherein an inner edge of the curled outer edge of the outwardly extending flange has a radius about the central capsule body axis of at least 32 mm.

24. The capsule according to claim 23, wherein the sealing member is positioned between the free end of the side wall of the aluminum capsule body and an inner edge of the curled outer edge of the outwardly extending flange.

25. The capsule according to claim 21, wherein the curled outer edge of the outwardly extending flange has a largest dimension of about 1.2 millimeter.

26. The capsule according to claim 1, wherein a height of the aluminum capsule body is about 28.4 mm.

27. The capsule according to claim 1, wherein the aluminum capsule body is truncated, wherein preferably the side wall of the aluminum capsule body encloses an angle with a line transverse to the central capsule body axis of about 97.5°.

28. The capsule according to claim 1, wherein the bottom of the aluminum capsule body has a largest inner diameter of about 23.3 mm.

29. The capsule according to claim 28, wherein the bottom of the aluminum capsule body is truncated, preferably having a bottom height of about 4.0 mm and wherein the bottom further has a generally flat central portion opposite the cover having a diameter of about 8.3 mm.

30. The capsule according to claim 1, wherein the capsule comprises an inner surface, and wherein on the inner surface of at least the side wall of the capsule an inner coating is provided.

31. The capsule according to claim 30, wherein the aluminum cover of the capsule is attached to the outwardly extending flange by means of a sealing lacquer, said inner coating being composed of the same material as the sealing lacquer.

32. The capsule according to claim 30, wherein the sealing member is free from an inner coating.

33. The capsule according to claim 1, wherein the capsule comprises an outer surface, and wherein on the outer surface of the capsule a color lacquer is provided.

34. The capsule according to claim 33, wherein on an outer surface of the color lacquer an outer coating is provided.

35. The capsule according to claim 33, wherein the sealing member is free from a color lacquer.

36. The capsule according to claim 1, wherein the projection, the side wall of the aluminum capsule body and the bottom of the trough are arranged such that the free contact end of the annular element contacts the bottom of the trough if the capsule is positioned in the enclosing member of the beverage preparation device and the enclosing member is closed by means of the closing member of the beverage preparation device.

37. The capsule according to claim 1, wherein the sealing member is deformable such that said projection fluid sealingly contacts at least a portion of the free contact end of the annular element if, in use, the maximum fluid pressure in the enclosing member of the beverage preparation device is in the range of 6-20 bar, preferably between 12 and 18 bar.

38. The capsule according to claim 1, wherein the sealing member is deformable such that said projection fluid sealingly contacts at least a portion of the free contact end of the annular element if, during brewing, said free contact end of the annular element exerts a force F2 on the sealing member of the capsule, wherein F2 is in the range of 500-1500 N preferably in the range of 750-1250 N when the fluid pressure P2 in said enclosing member outside the capsule is in the range of 6-20 bar, preferably between 12 and 18 bar.

39. The capsule according to claim 1, wherein the sealing member is deformable such that said projection fluid sealingly contacts at least a portion of the free contact end of the annular element if, in use, prior to or at the start of brewing, said free contact end of the annular element exerts a force F1 on the sealing member of the capsule,
wherein the force F1 is in the range of 30-150 N, preferably 40-150 N and more preferably 50-100 N, when the fluid pressure P1 in the enclosing member of the beverage preparation device outside the capsule is in the range of 0.1-4 bar, preferably 0.1-1 bar.

40. The capsule according to claim 1, wherein the sealing member is deformable such that said projection fluid sealingly contacts at least a portion of the free contact end of the annular element if the free contact end of the annular element that is pressed against the sealing member has a plurality of radially extending open grooves uniformly spaced relative to each other in circumferential sense of said free contact end of the annular element.

41. The capsule according to claim 40, wherein the sealing member is deformable such that said projection sealingly contacts at least a portion of the free contact end of the annular element if the greatest width of each of said grooves is 0.9-1.1 mm, preferably 0.95 to 1.05 mm, more preferably 0.98 to 1.02 mm wherein a maximal height of each of said grooves in an axial direction of the enclosing member of the beverage preparation device is 0.01-0.09 mm, preferably 0.03 to 0.07 mm, more preferably 0.045 to 0.055 mm, most preferred 0.05 mm and wherein the number of said grooves is 90 to 110, preferably 96.

42. A system for preparing a potable beverage from a capsule using a fluid supplied under pressure into the capsule, the system comprising:
a beverage preparation device comprising an enclosing member for receiving the capsule, wherein the enclosing member comprises fluid injection means for supplying fluid under pressure into the capsule, wherein the beverage preparation device further comprises a closing member for closing the enclosing member of the beverage preparation device, wherein the enclosing member of the beverage preparation device further comprises an annular element having a central annular element axis and a free contact end; and
a capsule according to claim 1.

43. The system according to claim 42, wherein said free contact end of the annular element is provided with a plurality of radially extending open grooves and has an outer circumferential surface portion contacting said projection, if the capsule is positioned in the enclosing member and as the enclosing member is closed by means of the closing member, and wherein said radially extending open grooves are deeper in an inner surface portion than in said outer circumferential surface portion or said radially extending open grooves are absent in said outer circumferential surface portion.

44. The system according to claim 42, wherein the trough has a radial width that is substantially larger than the radial thickness of said free contact end portion of the annular element, so that a clearance is left between said free contact end portion of the annular element and said side wall of said capsule body.

45. The system according to claim 42, wherein the projection has a generally inwardly facing surface portion extending at an enclosed angle of less than 8° and preferably less than 6° or less than 4° to the capsule body axis, and wherein the annular element is arranged for deformation of the generally inwardly facing surface portion.

46. The system according to claim 42, wherein the capsule is a capsule according to claim 18, and wherein the annular element has one or more bridges between outer and inner ridges, each bridge constituting an interruption of an annular space between the outer and inner ridges.

47. The system according to claim 42, wherein, in use, the maximum fluid pressure in the enclosing member of the beverage preparation device is in the range of 6-20 bar, preferably between 12 and 18 bar.

48. The system according to claim 42, wherein the system is arranged such that, in use, during brewing, a free contact end of the enclosing member of the beverage preparation device exerts a force F2 on the sealing member of the capsule to provide a fluid sealing contact between the outwardly extending flange of the capsule and the enclosing member of the beverage preparation device, wherein F2 is in the range of 500-1500 N preferably in the range of 750-1250 N when the fluid pressure P2 in the enclosing member of the beverage preparation device outside the capsule is in the range of 6-20 bar, preferably between 12 and 18 bar.

49. The system according to claim 42, wherein the system is arranged such that, in use, prior to or at the start of brewing, a free contact end of the enclosing member of the beverage preparation device exerts a force F1 on the sealing member of the capsule to provide a fluid sealing contact between the outwardly extending flange of the capsule and the enclosing member of the beverage preparation device, wherein F1 is in the range of 30-150 N preferably 40-150 N, more preferably 50-100 N, when the fluid pressure P1 in the enclosing member of the beverage preparation device outside the capsule is in the range of 0.1-4 bar, preferably 0.1-1 bar.

50. The system according to claim 42, wherein said free contact end of the annular element is provided with a plurality of radially extending open grooves and wherein the plurality of radially extending open grooves are uniformly spaced relative to each other in tangential direction of the free contact end of the annular element of the beverage preparation device.

51. The system according to claim 42, wherein the free contact end of the annular element is provided with a plurality of radially extending open grooves, wherein a greatest width of each groove is 0.9-1.1 mm, wherein a maximal height of each groove in an axial direction of the enclosing member of the beverage preparation device is 0.01-0.09 mm and wherein the number of grooves is 90 to 110.

52. The system according to claim 42,
wherein the system is arranged such that, in use, prior to or at the start of brewing, a free contact end of the enclosing member of the beverage preparation device exerts a force F1 on the sealing member of the capsule to provide a fluid sealing contact between the outwardly extending flange of the capsule and the enclosing member of the beverage preparation device, wherein F1 is in the range of 30-150 N preferably 40-150 N, more preferably 50-100 N, when the fluid pressure P1 in the enclosing member of the beverage preparation device outside the capsule is in the range of 0.1-4 bar, preferably 0.1-1 bar;
wherein the system is arranged such that, in use, during brewing, a free contact end of the enclosing member of the beverage preparation device exerts a force F2 on the sealing member of the capsule to provide a fluid sealing contact between the outwardly extending flange of the capsule and the enclosing member of the beverage preparation device, wherein F2 is in the range of 500-1500 N preferably in the range of 750-1250 N when the fluid pressure P2 in the enclosing member of the beverage preparation device outside the capsule is in the range of 6-20 bar, preferably between 12 and 18 bar;
wherein, in use, when the closing member of the beverage preparation device closes the enclosing member of the beverage preparation device at least the free contact end of the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free contact end of the enclosing member of the beverage preparation device, wherein the enclosing member comprises a first part and a second part wherein the second part comprises the free contact end of the enclosing member wherein the second part can move relative to the first part between a first and second position wherein the second part can move from the first position towards the second position in the direction of the closing member under the influence of fluid pressure in the enclosing member wherein optionally the force F1 is reached if the second part is in the first position with a fluid pressure P1 in the enclosing member and wherein optionally the force F2 is reached if the second part is moved towards the second position under the influence of the fluid pressure P2 in the enclosing member.

53. The system according to claim 42, wherein during use when the closing member of the beverage preparation device closes the enclosing member of the beverage preparation device the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free contact end of the enclosing member of the beverage preparation device.

* * * * *